Patented Apr. 19, 1949

2,467,382

UNITED STATES PATENT OFFICE 2,467,382

METHOD OF FORMING SYNTHETIC ELASTO-MERIC BUTADIENE COPOLYMERS

Charles Henry Hempel, Manitowoc, Wis., assignor to Heresite & Chemical Company, a corporation of Wisconsin No Drawing. Application January 30, 1947, Serial No. 725,255

10 Claims. (260—84.5)

This invention relates to an improvement in polymerizates and copolymerizates composed of butadiene, its homologues, halogen substitutes, alone or mixed together, or in mixtures with other compounds, polymerizable under the action of catalysts. Such formulas for making synthetic rubber-like compositions are widely known and described in many German and some English patents.

This application is a continuation-in-part of my copending applications filed September 24, 1943 as Serial Nos. 503,660, 503,661 and 503,662, now all abandoned.

The present process produces a higher yield of product in a single cycle, and, at the same time, produces a copolymer of superior quality. All of the formulas described in German or English patents give a yield of only 25% to 50%. The process herein described produces a yield of raw copolymer up to 95% when properly carried out with a solution of butadiene with styrene or substitutes, for instance, acrylonitrile.

The percentage of dimers may be cut down to the insignificant amount of 5%. The exclusion of all but a very small amount of dimers from the rubber-like polymerizate increases its quality greatly. The production of dimers is usually accelerated by increased temperature to yield a polymerizate of undesirable sticky consistency and low molecular weight. In the process described later herein, the high temperature usually required to obtain a good yield is made unnecessary by the addition of a second catalyst.

In the prior art, extremely high temperatures and pressures maintained for a considerable period of time were necessary to produce copolymerizates. Even then, a copolymer yield of 15 to 20% was considered satisfactory.

I have found that the use of an alkali metal hydroxide as an additional catalyst not only reduces the reaction time, but increases the copolymer yield to over 90%.

During the reaction hereafter described, some of the rubber is polymerized after four hours, more after six hours, and even more after eight hours, etc., until about 90% of the butadiene and styrene (or acrylonitrile) is polymerized into rubber. That portion of the copolymerizate forming early in the reaction tends to become tougher and less usable as rubber with increased time. To obtain a high yield of uniformly satisfactory and homogeneous rubber, it is essential that the copolymerizate formed early in the reaction be prevented from further reacting. I have found that the addition of a cyclic, symmetrical, hydrocarbon containing six carbon atoms and being inert to the reaction prevents the rubber which has been polymerized during the first few hours of polymerization from becoming tougher, as the remaining rubber is polymerized. Cyclohexane, or benzol, may be employed as the hydrocarbon, and when such materials are added in the manner hereinafter set forth, all rubber, upon becoming polymerized, remains with its original characteristics until the entire batch is completely polymerized. In other words, the benzol, or cyclohexane, acts as a retarder, or modifier, and is employed principally to obtain a softer rubber of homogeneous quality.

The preferred formula for a butadiene-styrene copolymer is as follows:

|  | Parts |
| --- | --- |
| Butadiene | 75 |
| Styrene | 25 |
| Water | 120 |
| Soap | 14 |
| Sodium hydroxide | 1 |
| Potassium persulfate | 2 |
| Benzol | 15 |

Acrylonitrile may be substituted for the styrene if Buna-N rubber is desired. Sodium persulfate may be substituted for the potassium persulfate, and cyclohexane may be substituted for the benzol. Any alkali metal hydroxide may be used in place of the sodium hydroxide, such as potassium hydroxide.

While the modifier, such as cyclohexane, or benzol, is shown in the above formula as 15 parts, the amount may be anywhere between 10 and 20 parts. The formula may be further varied within the following limits:

|  | Parts |
| --- | --- |
| Butadiene | 50 to 90 |
| Styrene (or acrylonitrile) | 10 to 50 |
| Water | 100 to 140 |
| Soap | 2 to 15 |
| Sodium hydroxide | 0.2 to 2.0 |
| Potassium persulfate | 0.1 to 4.0 |

In carrying out the process, a solution of common soap is made by adding soap in the proportion designated to warm water and agitating vigorously until the soap is completely dissolved and the solution is cooled. To this is added the styrene (or acrylonitrile), the styrene having been extracted with sodium hydroxide solution to remove the inhibitor, and the mixture is again agitated vigorously for about ten minutes. Then the sodium hydroxide, potassium persulfate, and benzol are added together and agitated for about fifteen minutes. This emulsion is pumped into a pot equipped with an efficient agitator and built to withstand the required pressure. The pot is also equipped with a pressure gauge and a thermometer. To this is added the butadiene, and the mixture under agitation is heated. The temperature should be held carefully between 36° C. and 40° C. The pot is closed and the above temperatures will generate a pressure within the pot of about 45 pounds per square inch, the particular pressure generated depending upon the temperature and somewhat on the reacting ingredients. The pressure will drop to zero in about 23 hours, signifying the completion of the reaction. Upon completion of the reaction, a white liquid is obtained which may be called a latex milk, as it looks similar to caoutchouc latex. If this latex is coagulated in certain acids, a rubberlike plastic is obtained, which, when exposed to treatment similar to that used for natural rubber can be developed into a fine rubber substitute, and may replace rubber in many instances. A suitable coagulant is 15% hydrochloric acid.

The foregoing detailed description has been given for clearness of understanding only, and no unnecessary limitations should be understood therefrom, for some modifications will be obvious to those skilled in the art.

I claim:

1. A method of copolymerizing butadiene and a material polymerizable therewith from the class consisting of styrene and acrylonitrile which comprises mixing in a closed zone butadiene with the said material in a ratio within the limits of 50 parts butadiene to 50 parts of the material, and 90 parts butadiene to 10 parts of the material in an aqueous medium and in the presence of 0.1 to 4.0 parts alkali metal persulfate, 0.2 to 2.0 parts alkali metal hydroxide, and 10 to 20 parts of a cyclic symmetrical hydrocarbon inert to the reaction and containing six carbon atoms in the ring, enclosing the mixture to produce a self-generated pressure thereon, heating the mixture to a temperature between 36° C. and 40° C., and maintaining the product at that temperature until the pressure has dropped to zero.

2. The method set forth in claim 1, in which the hydrocarbon is benzol.

3. The method set forth in claim 1, in which the hydrocarbon is cyclohexane.

4. The method set forth in claim 1, in which the alkali metal hydroxide is sodium hydroxide.

5. The method which comprises preparing a mixture containing 75 parts butadiene, 25 parts acrylonitrile, 2 parts alkali metal persulfate, 120 parts of an aqueous soap solution, 10 to 20 parts benzol, and 0.2 to 2 parts of sodium hydroxide, by weight, enclosing the mixture to produce a self-generated pressure thereon, heating the mixture to a temperature between 36° C. and 40° C. to produce a self-generated pressure of 45 pounds per square inch, and maintaining the product at that temperature range until the pressure has dropped to zero.

6. The method which comprises preparing a mixture containing 75 parts butadiene, 25 parts styrene, 2 parts alkali metal persulfate, 120 parts of an aqueous soap solution, 10 to 20 parts benzol, and 0.2 to 2 parts of sodium hydroxide, by weight, enclosing the mixture to produce a self-generated pressure thereon, heating the mixture to a temperature between 36° C. and 40° C. to produce a self-generated pressure of 45 pounds per square inch, and maintaining the product at that temperature range until the pressure has dropped to zero.

7. The method which comprises preparing a mixture containing 75 parts butadiene, 25 parts acrylonitrile, 2 parts alkali metal persulfate, 120 parts of an aqueous soap solution, 10 to 20 parts of cyclohexane, and 0.2 to 2 parts of sodium hydroxide, by weight, enclosing the mixture to produce a self-generated pressure thereon, heating the mixture to a temperature between 36° C. and 40° C. to produce a self-generated pressure of 45 pounds per square inch, and maintaining the product at that temperature range until the pressure has dropped to zero.

8. The method which comprises preparing a mixture containing 75 parts butadiene, 25 parts styrene, 2 parts alkali metal persulfate, 120 parts of an aqueous soap solution, 10 to 20 parts of cyclohexane, and 0.2 to 2 parts of sodium hydroxide, by weight, enclosing the mixture to produce a self-generated pressure thereon, heating the mixture to a temperature between 36° C. and 40° C. to produce a self-generated pressure of 45 pounds per square inch, and maintaining the product at that temperature range until the pressure has dropped to zero.

9. The method which comprises preparing a mixture containing 75 parts butadiene, 25 parts of a material polymerizable therewith from the class consisting of styrene and acrylonitrile, 2 parts alkali metal persulfate, 10 to 20 parts benzol, 0.2 to 2 parts of sodium hydroxide, by weight, in an aqueous soap solution, enclosing the mixture, heating the mixture to a temperature between 36° C. and 40° C. to produce a self-generated pressure of 45 pounds per square inch, and maintaining the product at that temperature range until the pressure has dropped to zero.

10. The method which comprises preparing a mixture containing 75 parts butadiene, 25 parts of a material polymerizable therewith from the class consisting of styrene and acrylonitrile, 2 parts alkali metal persulfate, 10 to 20 parts benzol, 0.2 to 2 parts of alkali metal hydroxide, by weight, in an aqueous soap solution, enclosing the mixture, heating the mixture to a temperature between 36° C. and 40° C. to produce a self-generated pressure of 45 pounds per square inch, and maintaining the product at that temperature range until the pressure has dropped to zero.

CHARLES HENRY HEMPEL.

No references cited.